US012270525B2

(12) United States Patent
Matthes

(10) Patent No.: US 12,270,525 B2
(45) Date of Patent: Apr. 8, 2025

(54) REMOVEABLE LIGHTING FIXTURE

(71) Applicant: Bunk16 LLC, Denver, CO (US)

(72) Inventor: Rose Matthes, Denver, CO (US)

(73) Assignee: BUNK16 LLC, Denver, CO (US)

( * ) Notice: Subject to any disclaimer, the term of this patent is extended or adjusted under 35 U.S.C. 154(b) by 0 days.

(21) Appl. No.: 18/223,214

(22) Filed: Jul. 18, 2023

(65) Prior Publication Data

US 2024/0052983 A1 Feb. 15, 2024

Related U.S. Application Data

(63) Continuation of application No. 17/494,723, filed on Oct. 5, 2021, now Pat. No. 11,703,196.

(60) Provisional application No. 63/088,011, filed on Oct. 6, 2020.

(51) Int. Cl.

| | |
|---|---|
| ***F21S 8/00*** | (2006.01) |
| ***F21S 9/02*** | (2006.01) |
| ***F21V 21/02*** | (2006.01) |
| ***F21V 21/088*** | (2006.01) |
| ***F21V 21/096*** | (2006.01) |
| ***F21V 23/06*** | (2006.01) |

(52) U.S. Cl.

CPC ................. *F21S 8/036* (2013.01); *F21S 9/02* (2013.01); *F21V 21/02* (2013.01); *F21V 21/088* (2013.01); *F21V 21/096* (2013.01); *F21V 23/06* (2013.01)

(58) Field of Classification Search

CPC .......... F21S 9/02; F21V 21/02; F21V 21/088; F21V 21/096; F21V 23/06; F21V 17/105; F21V 17/12; F21V 19/0045

See application file for complete search history.

(56) References Cited

U.S. PATENT DOCUMENTS

| | | | | |
|---|---|---|---|---|
| D261,559 | S | 10/1981 | Palka | |
| 5,275,366 | A | 1/1994 | Simmons | |
| 6,633,110 | B2 * | 10/2003 | McGuire | F21V 29/15 313/112 |
| D588,296 | S | 3/2009 | Sabermig | |
| 8,011,801 | B2 * | 9/2011 | Mock | H04N 1/2158 362/249.02 |

(Continued)

FOREIGN PATENT DOCUMENTS

| | | | | |
|---|---|---|---|---|
| EP | 1612476 A1 | * 1/2006 | | F21V 21/096 |
| WO | WO 2016176564 | * 11/2016 | | F21V 17/00 |

OTHER PUBLICATIONS

EP 1612476, Hans-Walter Hustadt, Jan. 4, 2006 , English Translation (Year: 2006).*

(Continued)

*Primary Examiner* — Christopher E Dunay

(74) *Attorney, Agent, or Firm* — Sheridan Ross P.C.

(57) ABSTRACT

A light fixture is disclosed. The light fixture includes: a mounting base, with a surface for interfacing with a wall; a fixture face plate; a decorative fixture element with a light socket; and a catch mechanism for securing the fixture face plate to the mounting base. The catch mechanism includes; at least one catch receiver, at least one catch aperture, and at least one catch insert. The mounting base is secured to a wall. The fixture face plate is secured to the mounting base when the at least one catch insert is inserted into the catch aperture and then rotated into the at least one catch receiver.

20 Claims, 8 Drawing Sheets

(56) References Cited

U.S. PATENT DOCUMENTS

| | | | | |
|---|---|---|---|---|
| 8,289,814 | B2 * | 10/2012 | Chien | H02G 3/14 368/80 |
| D697,249 | S | 1/2014 | Pyle | |
| 9,318,886 | B1 * | 4/2016 | Pate | F21V 21/096 |
| D825,092 | S | 8/2018 | Amato | |
| 10,618,709 | B1 | 4/2020 | Seiders et al. | |
| D905,317 | S | 12/2020 | Czarnocki | |
| 11,085,616 | B1 * | 8/2021 | Cui | F21V 23/0471 |
| 11,262,054 | B1 | 3/2022 | Melamed | |
| D968,674 | S | 11/2022 | Rindt | |
| D975,907 | S | 1/2023 | Huang | |
| 11,703,196 | B2 * | 7/2023 | Fierman | F21V 21/096 362/432 |
| D1,006,297 | S | 11/2023 | Li | |
| D1,052,784 | S | 11/2024 | Matthes et al. | |
| 2007/0257165 | A1 | 11/2007 | Newbould et al. | |
| 2013/0155684 | A1 * | 6/2013 | Chen | F21V 19/00 362/285 |
| 2018/0042089 | A1 | 2/2018 | Cho et al. | |
| 2019/0145612 | A1 * | 5/2019 | Crosby | F21V 14/04 362/245 |
| 2021/0088198 | A1 | 3/2021 | Kaule | |

OTHER PUBLICATIONS

"TOCOCO E27 Nordic Modern Wall Lamp Iron Black Indoor Lighting," Amazon.com, Inc., First Available Dec. 24, 2022, 4 pages [retrieved online Jun. 14, 2024 from: www.amazon.com/TOCOCO-Lighting-Bedside-Bathroom-Industrial/dp/B0BR5DDPZ8?th=1].

Wearable Search "Poplight! Wall lighting for everyone," Youtube, Feb. 21, 2023, 2 pages [retrieved online Jun. 14, 2024 from: www.youtube.com/watch?v=sw2VfPBpSCg].

* cited by examiner

REMOVEABLE LIGHTING FIXTURE

CROSS-REFERENCE TO RELATED APPLICATIONS

This application is a continuation of U.S. patent application Ser. No. 17/494,723 entitled "Removable Lighting Fixture" filed on Oct. 5, 2021, which claims priority to U.S. Provisional Patent Application No. 63/088,011 entitled "Removable Lighting Fixture" and filed on Oct. 6, 2020, the contents of which are incorporated herein by reference in their entirety.

TECHNICAL FIELD

This application relates to lighting fixtures and, more specifically, to light fixtures having separable bases and fixture housing in which the fixture can be battery powered.

BACKGROUND

It is often desirable to add lighting to rooms. This often helps to make a room more inviting and encourages people to spend time in those rooms. Adding lighting to a room is generally limited by at least one of several factors. One factor is the difficulty of installing lighting, which requires either knowledge of electrical wiring, or the hiring of an electrician who does have the knowledge and experience to install electrical lighting. Another factor is the number of electrical outlets in rooms.

SUMMARY

In an embodiment, the disclosure provides a light fixture, comprising a mounting base. The mounting base includes a surface for interfacing with a wall and at least one catch aperture. The light fixture includes a fixture component including a fixture face plate, a decorative fixture element with a light socket, and a catch mechanism for securing the fixture face plate to the mounting base. The catch mechanism includes at least one catch insert configured to interface with the catch aperture of the mounting base. The fixture face plate is secured to the mounting base when the at least one catch insert is inserted into the catch aperture and the fixture face plate is rotated with respect to the mounting base.

In another aspect, the disclosure provides an apparatus for securing objects to a wall. The apparatus includes a mounting base, with a surface for interfacing with a wall, a face plate, which attaches to objects, and a catch mechanism for securing the face plate to the mounting base. The catch mechanism includes comprising at least one catch receiver, at least one catch aperture, and at least one catch insert. The mounting base is configured to be secured to a wall and the face plate is secured to the mounting base when the at least one catch insert is inserted into the catch aperture and then rotated into the at least one catch receiver.

In another aspect, the disclosure provides a device including a mounting base. The mounting base includes a catch aperture, and a surface configured to interface with a wall surface. The device includes a fixture component. The fixture component includes a fixture face plate, a fixture post coupled to the fixture face plate, a fixture hood coupled to the fixture post, a light socket coupled to the fixture hood, and a catch mechanism for securing the fixture face plate to the mounting base.

Further aspects and embodiments are provided in the foregoing drawings, detailed description, and claims.

BRIEF DESCRIPTION OF THE DRAWINGS

The drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
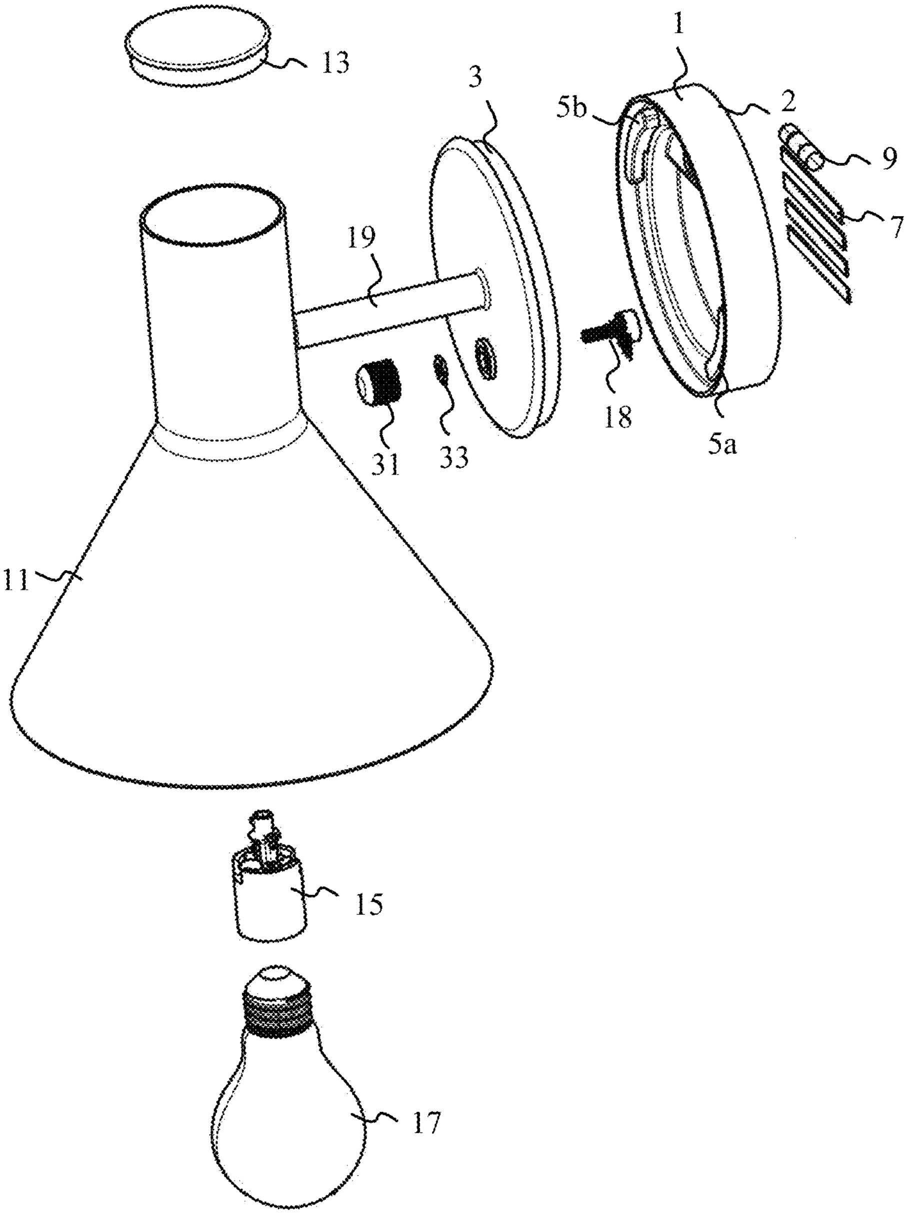
FIG. 1 is an exploded view of one embodiment of a repositionable light fixture.

The following description recites various aspects and embodiments of the inventions disclosed herein. No particular invention is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly indicates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only to aid in understanding embodiments illustrated in the present disclosure and are not meant to be limiting in any fashion. Nor do these phrases indicate any kind of preference for the disclosed embodiment.

As used herein "double-sided tape" is meant to refer to tape that has pressure-sensitive adhesive exposed on both sides. This enables two parts to be secured together. The carrier holding the adhesive can range in thickness from a film a fraction of a millimeter to a foam several millimeters thick. Additionally, the adhesive can be formulated for specific purposes, some adhesives are low tack and repositionable while others form a permanent bond. Some double-sided tape has the same adhesive on both sides while others utilize two different adhesives. Many of the adhesive formulations are designed to be removed without leaving any residue. 3M VHB tapes, 3M Thin Bonding tapes, and 3M Foam tapes are examples of double-sided tapes.

As used herein "adhesive strips" is meant to refer to specifically sized pieces of double-sided tape.

Adding lighting to a room can transform the room from a drab cave where into a warm haven. In particular many older homes were constructed with limited lighting. Additionally, these older homes were also constructed with a limited number of electrical outlets. Adding lighting to rooms in these homes can be difficult. An electrician is often required to install the lights. Adding lamps is limited by the number of electrical outlets and the floor space. The repositionable lighting fixture enables installation of electrical lighting without the need of an electrician.

An additional consideration is that dorms and rental propertied often have restrictions on the methods for attaching objects to walls. Many dorms and rental properties do not allow nailing or screwing objects into the walls of the dorm or rental property. This severely limits the possibilities for adding lights or other objects to walls.

Now referring to FIG. 1 which is an exploded view of one type of repositionable lighting fixture. A mounting base 1 has a flat side 2 for placing against a wall. The flat side 2 operates as an interface for a wall surface and ensures that the mounting base 1 sits flush against the wall surface. The flat side 2 of the mounting base ensures a good wall to mounting base 1 interface. The mounting base 1 can be secured to a wall by double sided adhesive strips (or double-sided adhesive tape), such as double sided adhesive strip 7, attached to the flat side 2, although in other embodiments and appropriate mechanism or fixtures may be used to secure base 1 against a suitable mounting surface. Securing the mounting base 1 to a wall with double sided adhesive strips can be the preferred embodiment for securing the mounting base 1 to a wall. In that case, the adhesive strips are secured to the flat side 2 of mounting base 1 and then secured to a wall. In most configurations the adhesive is formulated to be cleanly removed from the wall after use. In some alternative configurations a permanent bond is more important than a clean removal, in these configurations the adhesive will leave a residue on the wall.

Typically, between two and eight adhesive strips are used to mount base 1 to a wall surface. Preferably, between two and six adhesive strips are used. More preferably, between three and five adhesive strips are used. Most preferably, four adhesive strips are used. In some embodiments, the mounting base includes molded areas configured to receive at least a portion of the adhesive strips and so the wall-mounting surface (e.g., side 2) may not be perfectly flat and may instead be contoured for a particular application. For example, in these embodiments, the mounting base is not flat, instead the base includes depressions that correspond to the size of the adhesive strips. Alternatively, the double-sided adhesive can be configured as circles, with a large circle going to the edge of the mounting base and smaller circles working inwards to the center. Alternative embodiments employ alternative methods for securing the mounting base to a wall, including hook and loop (often known by the trademark Velcro), screws, nails, or hooks. The hook and loop attachment is secured very similarly to the double-sided adhesive tape either in strips or in circles around the mounting base. The number of adhesive strips corresponds to the size and weight of the light fixture.

Fixtures of differing sizes and weights may require different amounts of adhesive tape to secure the fixture to a wall. In some embodiments, the fixture is attached to a ceiling. The adhesive strips are designed to securely hold the mounting base to the wall. Differing compositions of adhesive provide differing characteristics for the fixture. Some of the adhesive compositions are designed to be permanent, thus securing the mounting base indefinitely to the wall or ceiling. Other adhesive compositions are designed to be easily removable so that the mounting base and thus the fixture may be removed from the wall with no sign it was attached to the wall.

The mounting base includes a level 9. The level 9 can assist a user in ensuring that the repositionable light fixture is secured in a level position. The level 9 fits within a recess on the mounting base 1. In the pictured embodiment, the fixture face plate 3 obscures the level when the fixture face plate 3 is attached to the mounting plate 1. This enables the level 9 to assist in the installation of the mounting base in a level position, and be hidden from view. Keeping the level hidden from view is desirable to present a streamlined and professional light fixture. In other embodiments, the fixture face plate 3 includes a window through which the level is visible. While a typical light fixture does not include a visible level, some individuals will enjoy seeing the level in their fixture.

Fixture face plate (e.g., fixture housing) 3 attaches to the mounting base 1. The fixture face plate 3 is secured to the mounting base 1 by a catch mechanism. The mechanism has catch inserts, catch apertures, and catch receivers. In the depicted embodiment, two catch inserts 5*a* and 5*b* are included on the mounting base 1. The catch inserts slide into catch apertures formed on face plate 3 (not illustrated in FIG. 1) and are twisted to secure them in the catch receivers. As the catch inserts 5*a* and 5*b* are twisted into the catch receivers, the fixture face plate 3 is locked in place in the mounting base 1.

A fixture post 19 attaches a fixture hood 11 to the fixture face plate 3. A light socket 15 is coupled to and concealed by the fixture hood 11. An end cap 13 may be removable from fixture hood 11 enabling insertion of light socket 15 into fixture hood 11. The fixture hood 11 directs the light from the light bulb 17. Taken together, fixture post 18, fixture hood 11 and light socket 15 form a decorative fixture element. The decorative fixture element in combination with the fixture face plate 3 is referred to as a fixture component. One advantage of the repositionable lighting fixture is that multiple different fixture assemblies can be used. This enables the redecorating of a space without the need to employ an electrician or to remove or add wiring to an existing room.

The fixture face plate 3 is removable from the mounting base 1. While the embodiment described here describes a single fixture face plate 3, the mounting base 1 is designed to accept multiple fixture face plates 2. This enables different fixtures to be attached to the mounting base, where the various different fixtures each share similarly configured face plates 2. This enables the changing of the fixture without removing the mounting base. The character of a room can thus be changed with a change in the fixture. Differing fixtures help to convey differing eras or styles. For example, a mid-century modern fixture, conveying contemporary style could be exchanged for an industrial or steam punk style. Additionally, the mounting base may be moved to different locations. In some embodiments, the difficulty in moving the mounting base will depend on the adhesive formulation used on the adhesive strips. A person who wants the freedom to reconfigure the lights in a room often, will choose adhesive strips with an adhesive formulation that is easily removable. The lighting fixture will ship with the adhesive strips chosen by the user based on their needs. There will be options such as permanent installation, easily removed installation, and medium difficulty removed installation. The differing options of adhesives help ensure that people with different priorities find the solution that works for them. A student in a dorm will want to install a light that can be removed at the end of the semester. The student in this situation would choose the adhesive which is either easily removed or a medium difficulty to remove, this will enable the student to add light to the dorm and then remove that light without damaging the wall. A person who owns their home and wishes to add light to a room may decide to permanently attach a light within the home.

Alternatively, the mounting base is secured to the wall with hook and loop fasteners. When using hook and loop fasteners the base is removable from the wall and another base can be placed in the same location. With the hook and loop the bases are easily removable and interchangeable, however the location of the fixture would remain the same unless a new side of the hook and loop fastener is placed in a new location.

In alternative embodiment other objects are secured to the mounting base. These objects include pictures, picture frames, mirrors, digital picture frames, and clocks. By including the ability of objects other than light fixtures to attach to the mounting base, the ability to attach objects to a wall without damaging the wall is increased along with the ability to reconfigure a room. Mounting bases are able to be placed in various locations and the light fixtures and other objects are able to be arranged according to the desire of the user.

The fixture includes a potentiometer 18 for controlling the light output, or dimming the light. The potentiometer is secured to the fixture face plate with a fixing nut 33. A knob 31 for turning the potentiometer 18 is attached to the potentiometer. The potentiometer 18 is electrically coupled between a power source of the fixture depicted in FIG. 1 and light bulb 17. Potentiometer 18 can thereby affect an amount of electrical current being supplied to light bulb 17 and, thereby, the brightness of light bulb 17.

The fixture requires components to operate including electronics and wiring. In the depicted embodiment these components are housed within the mounting base 1. This embodiment of the fixture utilizes a mounting base 1 with walls. The mounting base 1 includes side walls which creates a space for the components to be housed.

Figure 2:
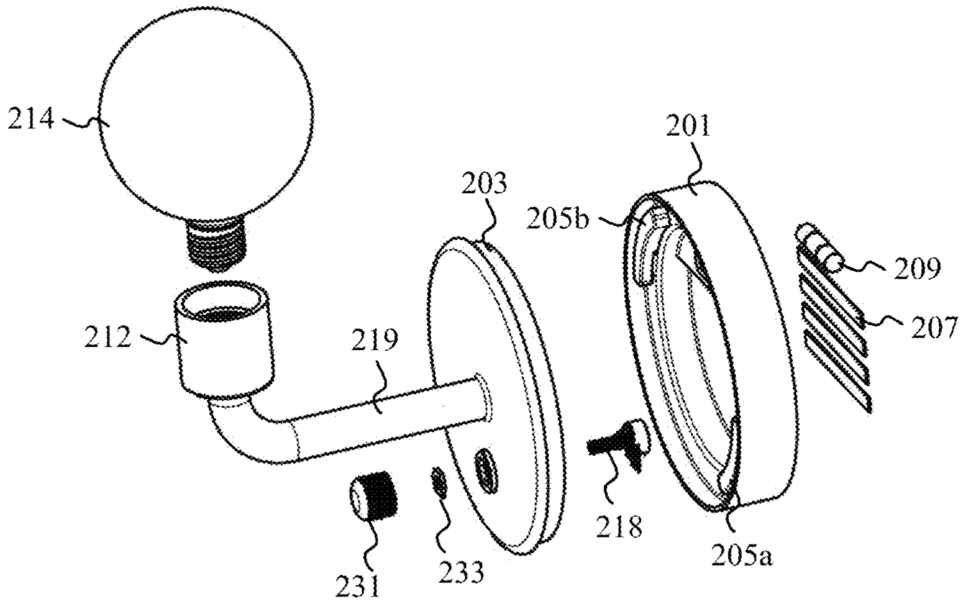
FIG. 2 is an exploded view of one embodiment of a repositionable light fixture.

Referring to FIG. 2 which is an exploded view of one type of repositionable lighting fixture. The mounting base 201 is secured to a wall with double sided adhesive strips (or double-sided adhesive tape), such as double sided adhesive strip 207. Securing the mounting base to a wall with double sided adhesive strips is the preferred embodiment for securing the mounting base 201 to a wall. The adhesive strips are secured to the mounting base and then secured to a wall. Typically, between two and eight adhesive strips are used. Preferably, between two and six adhesive strips are used. More preferably, between three and five adhesive strips are used. Most preferably, four adhesive strips are used. Alternatively, the double-sided adhesive is configured as circles, with a large circle going to the edge of the mounting base and smaller circles working inwards to the center. Alternative embodiments employ alternative methods for securing the mounting base to a wall, including hook and loop (often known by the trademark Velcro), screws, nails, or hooks. The hook and loop attachment is secured very similarly to the double-sided adhesive tape either in strips or in circles around the mounting base.

The mounting base includes a level 209. The level ensures that the repositionable light fixture is secured in a level position.

A fixture face plate or fixture housing 203 attaches to the mounting base 201. The fixture face plate 203 is secured to the mounting base 201 by a twisting catch mechanism. The mechanism has catch inserts and catch receivers. In the depicted embodiment, two catch inserts 205*a* and 205*b* are included on the mounting base 201. The inserts slide into the receivers and are twisted to secure them in the receivers. As the catch inserts 205*a* and 205*b* are twisted into the catch receivers the fixture face plate 203 is locked in place in the mounting base 201.

A fixture post 219 attaches a light socket 212 to the fixture face plate 203. The light socket is exposed for a light bulb 214. Typically, a light in this creation creates a different feel for the room than a light fixture with a hood as is described in FIG. 1. The light 214 is generally one of two types, either an opaque glass that conceals the interior of the bulb or a clear bulb that allows visibility to see the filament coils. The clear bulbs with visible coils are often referred to as Edison Bulbs because they resemble early lightbulbs associated with Thomas Edison.

The fixture includes a potentiometer 18 for controlling the light output, or dimming the light. The potentiometer is secured to the fixture face plate with a fixing nut 33. A knob 31 for turning the potentiometer 18 is attached to the potentiometer.

Figure 3:
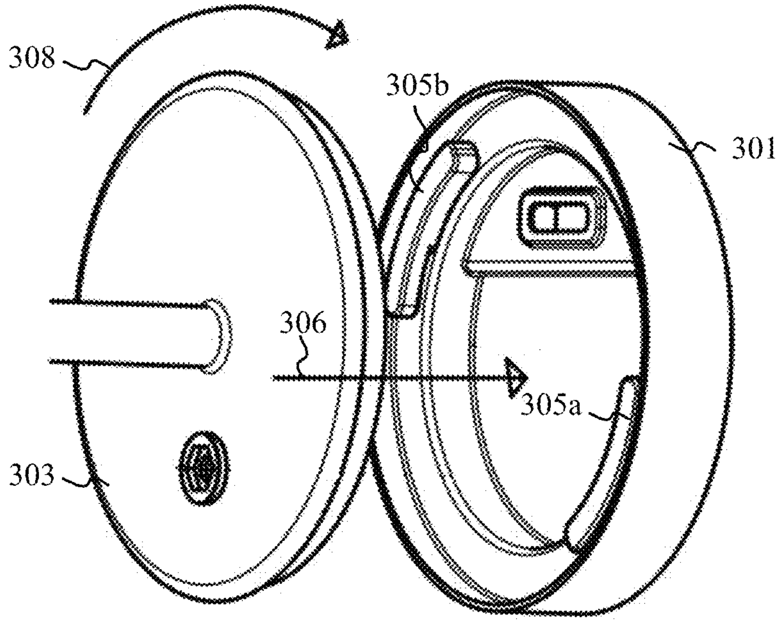
FIG. 3 is a view of the mounting base and fixture face plate of an embodiment of the repositionable light fixture.

Referring to FIG. 3 which shows an exploded view of the front of a face plate fixture in the process of securing a fixture face plate 303 to a mounting base 301. The fixture face plate 303 is pushed into the mounting base 301 in the direction 306. As the fixture face plate 303 is pushed in, the catch inserts 305*a* and 305*b* are positioned within the catch apertures (see apertures 404 of FIG. 4). Once the fixture face plate 303 has been pushed into the mounting plate 301, and the catch inserts 305 have fit within the catch apertures, the fixture face plate 303 is rotated in a clockwise direction 308. As the fixture face plate 303 is rotated clockwise, the catch inserts 305*a* and 305*b* lock in place within the catch receivers.

Figure 4:
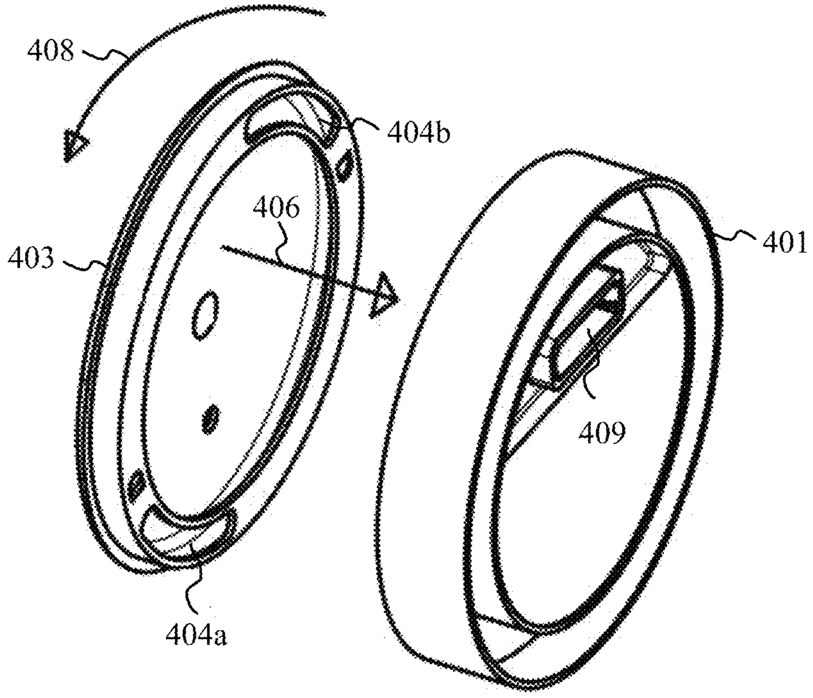
FIG. 4 is a view of the mounting base and fixture face plate of an embodiment of the repositionable light fixture.

Referring to FIG. 4 which shows an exploded view of the back side of the fixture face plate 403 in the process of being secured to a mounting base 401. FIG. 4 is, in embodiments, a back side view of the device depicted in FIG. 3. The fixture face plate 403 is pushed into the mounting base in the direction 406. As the fixture face plate 403 is pushed in, the catch inserts (see cat inserts 305 of FIG. 3) fit within the catch apertures 404*a* and 404*b*. Once the fixture face plate 403 has been pushed into the mounting plate 401, and the catch inserts have fit within the catch apertures, the fixture face plate is rotated in a clockwise direction 408. As the fixture face plate is rotated clockwise, (though the rotation appears counterclockwise in relation to the figure on the page because FIG. 4 depicts a back view of the device, the fixture face plate 403 is still rotated clockwise when viewed from the front of the fixture face plate 403) the catch inserts lock in place within the catch receivers or apertures 404. The mounting base includes a level pocket 409 for a level to be located within the mounting base 401. In some embodiments, the mounting base 401 is not a completely flat surface but contains flat regions suitable for mounting against a wall or ceiling surface.

Figure 5:
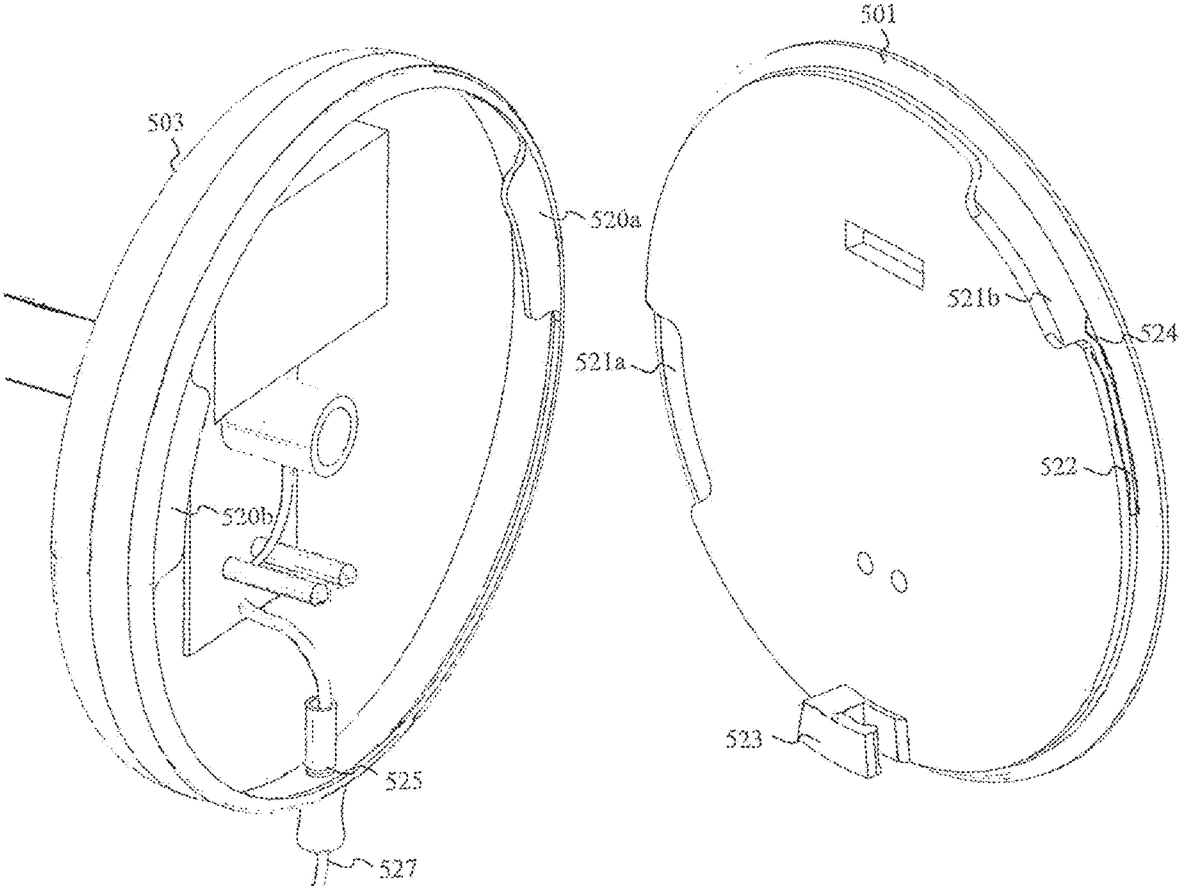
FIG. 5 is an exploded internal view of an embodiment of the fixture showing the fixture's mounting base and fixture face plate.

Referring to FIG. 5 which shows an exploded view of a mounting base and the fixture face plate disassembled. A mounting base 501 includes catch receivers 522. Once the mounting base 501 is secured to a wall, the fixture face plate 503 is attached to the mounting base 501. The catch inserts 520*a* and 520*b* are inserted into the catch apertures 521*a* and 521*b*. Once the catch inserts are placed within the catch apertures 521*a* and 521*b* the fixture face plate 503 is rotated so that the catch inserts 520*a* and 520*b* lock into place within the catch receivers 522. For example, catch insert 520*b* fits snuggly within catch receiver 522. The catch mechanism is designed to securely hold the fixture face plate 503 to the mounting base 501. The catch inserts 520*a* and 520*b* fit snuggly within the catch receivers 522. The friction of the sides of the catch inserts 520*a* and 520*b* coming in contact with the sides of the catch receivers 522 keeps the fixture face plate 503 in place on the mounting base 501. In some embodiments, the catch receivers 522 include receiver stops such as receiver stop 524. The receiver stops 524 may represent a narrowed or constricted portion of the catch receivers 522 that is arranged to hold the catch inserts 520*a* and 520*b* more securely within the catch receivers 522. The receiver stop 524 can thereby prevent the catch insert 520*b* from sliding out of the catch receiver 522. Though the example shows only catch receiver 522 and receiver stop 524, which hold catch insert 520*b*, a catch receiver 522 and receiver stop 524 which correspond to catch insert 520*a* would also be present in the fixture. The fixture is powered by the home's electrical system. An electrical cord 527 passes through the fixture face plate 503 and the electrical cord 527 attaches to a plug to insert into an electrical outlet. On the inside of the fixture face plate 503 the electrical cord 527 passes through a cord tube 525. The cord tube 525 protects the electrical cord 527. The cord tube 525 also assists in securing the fixture face plate 503 to the mounting base 501. A tube hook 523 fits around the cord tube 525.

Figure 6:
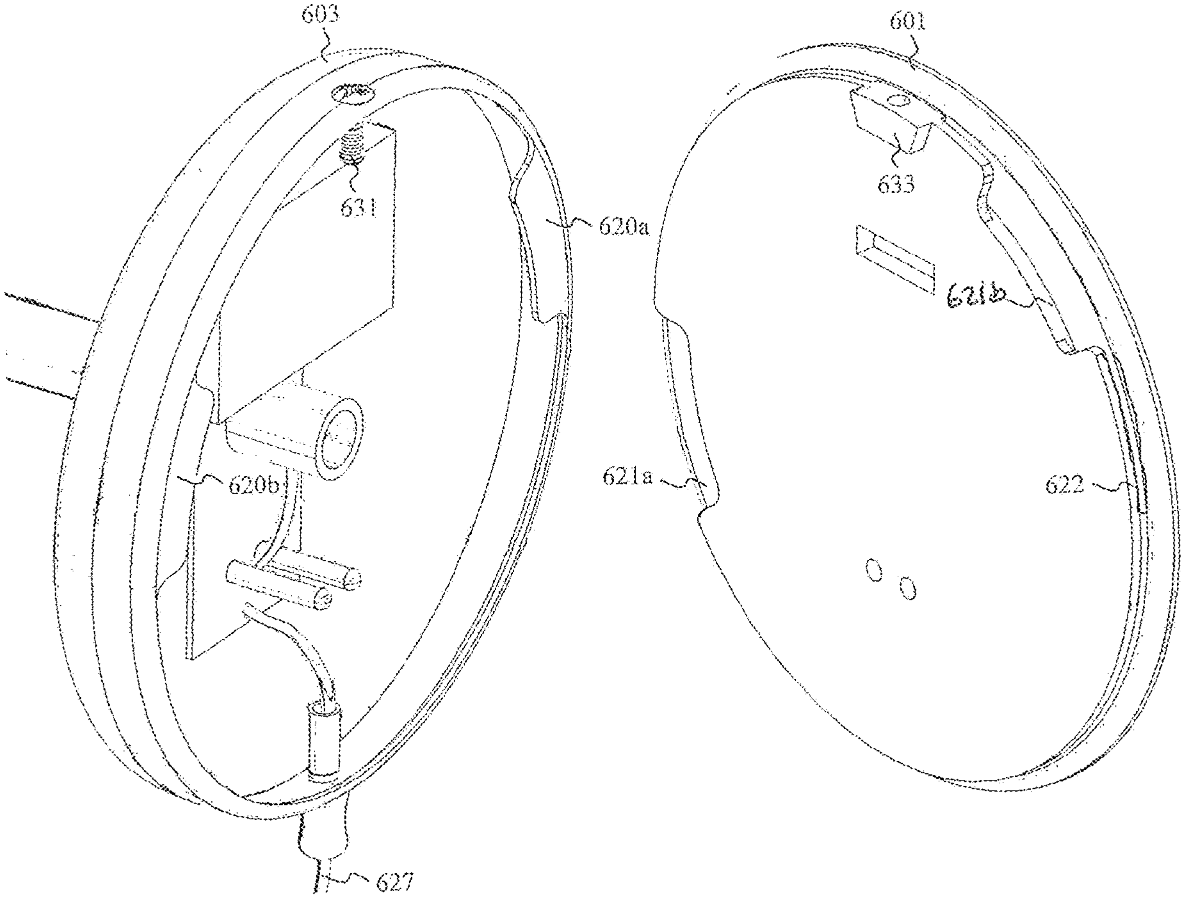
FIG. 6 is an exploded internal view of an embodiment of the fixture showing the fixture's mounting base and fixture face plate.

Referring to FIG. 6 which shows an exploded view of a mounting base and the fixture face plate disassembled. A mounting base 601 includes catch aperture 621*a* and 621*b*. Once the mounting base 601 is secured to a wall, the fixture face plate 603 is attached to the mounting base 601. The catch inserts 620*a* and 620*b* are inserted into the catch apertures 621*a* and 621*b*. Once the catch inserts are placed within the catch apertures 621*a* and 621*b* the fixture face plate 603 is rotated so that the catch inserts 620*a* and 620*b* lock into place within the catch receivers. For example, catch insert 620*b* is rotated into catch receiver 622. This embodiment depicts an embodiment of the fixture powered by the home's electrical system. An electric cord 627 passes through the fixture face plate 603 the electrical cord attaches to a plug to insert into an electrical outlet. On the inside of the fixture face plate 603 the electric cord passes through a cord tube 625. The cord tube 625 protects the electrical cord. To more securely attach the fixture face plate 603 to the mounting base, a screw 631 is inserted into a receiver. This attachment securely holds the fixture face plate 603 to the mounting base 601.

Figure 7:
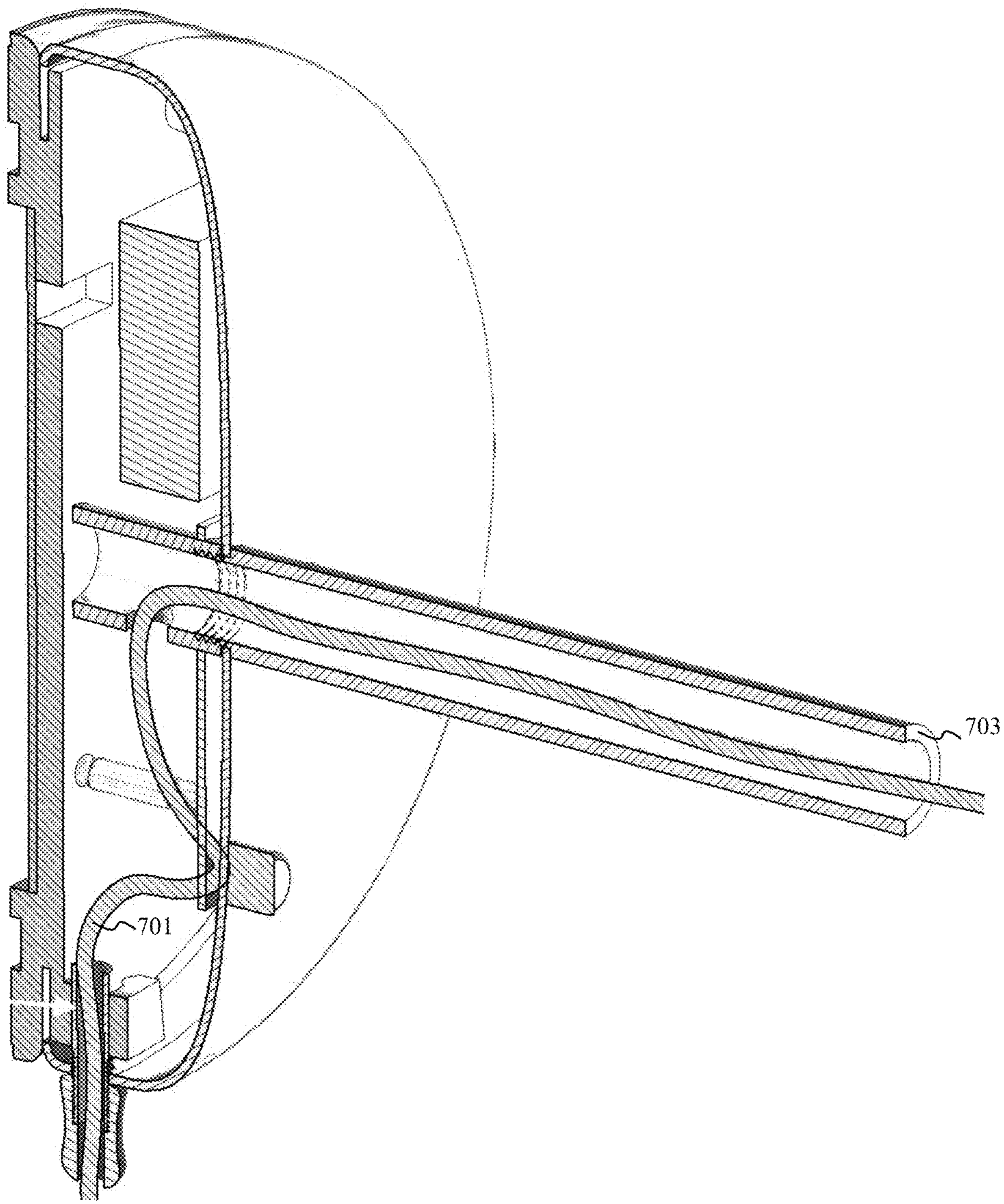
FIG. 7 is a cross sectional view of an embodiment of the fixture.

Referring to FIG. 7 which is a cross sectional view of one embodiment of the repositionable light fixture. The electric cord 701 for the light runs through a fixture post 703 to the light socket. The electric cords enter the fixture at the bottom and run to the light socket.

Figure 8:
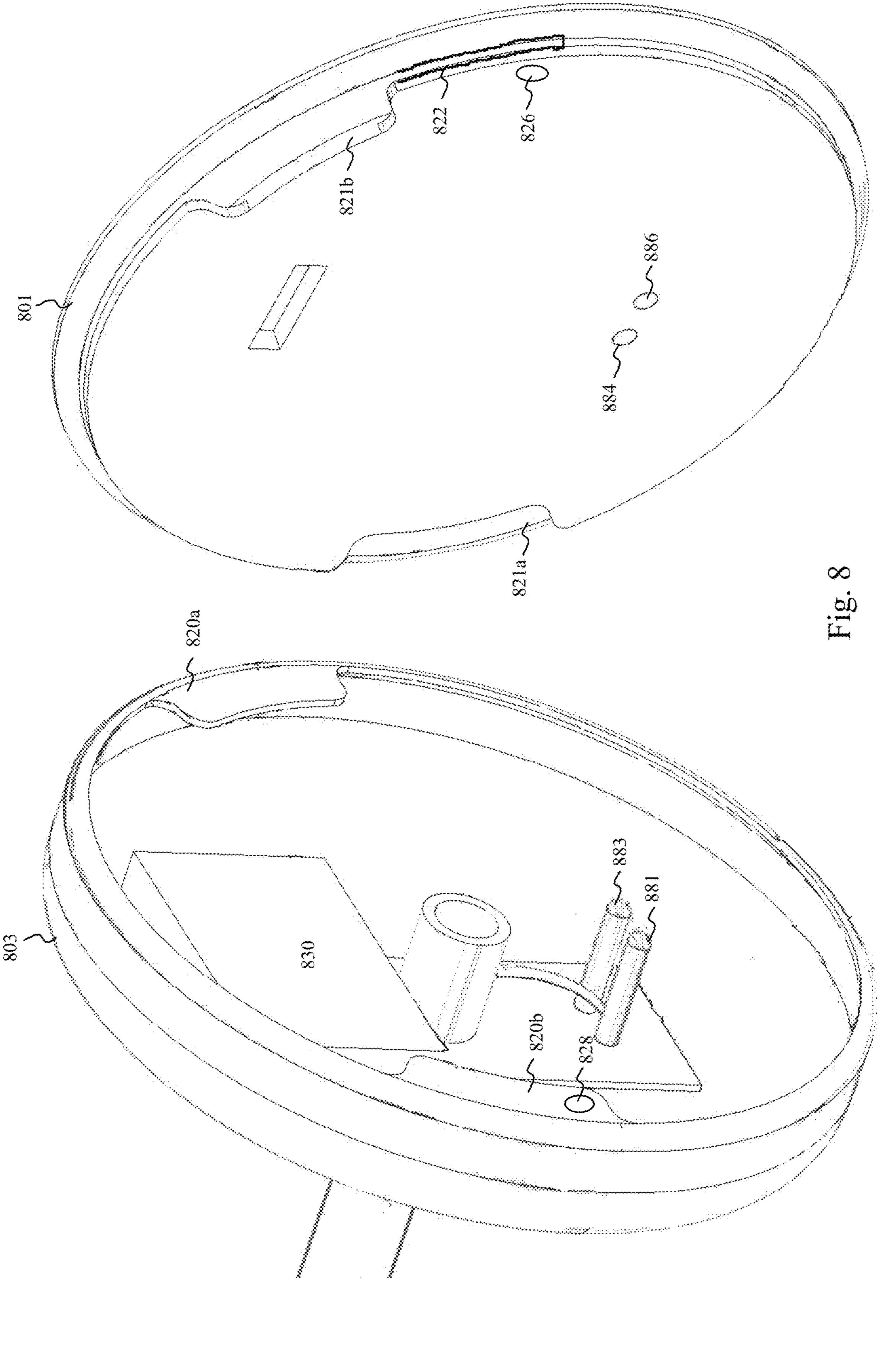
FIG. 8 is an exploded internal view of an embodiment of the fixture showing the fixture's mounting base and fixture face plate.

Referring to FIG. 8 which shows a view of an embodiment of a mounting base and the fixture face plate disassembled. A mounting base 801 includes catch apertures 821*a* and 821*b*. Once the mounting base 801 is secured to a wall, the fixture face plate 803 is attached to the mounting base 801. The catch inserts 820*a* and 820*b* are inserted into the catch apertures 821*a* and 821*b*. Once the catch inserts 820 are placed within the catch apertures 821*a* and 821*b* the fixture face plate 803 is rotated so that the catch inserts 820*a* and 820*b* lock into place within the catch receivers. For example, catch insert 820*b* is rotated into catch receiver 822. In some embodiments the catch inserts 820 include a magnet 828 which corresponds to a magnet 826 in the catch receivers 822. These magnets 826, 828 can increase the holding power of the catch mechanism. Once the magnets 826, 828 engage each other the fixture face plate 803 is securely attached to the mounting base 801. For example, catch insert 820*b* includes magnet 828. Catch receiver 822 includes magnet 826. When catch insert 820*b* is rotated into catch receiver 822 magnet 828 will engage with magnet 826. In some embodiments magnet 828 is installed on a single side of catch insert 820*b*. In some embodiments, the magnet traverses the entire width of catch insert 820*b*. In some embodiments a single magnet will be installed on one side of the catch receiver. In other embodiments two magnets will be installed in the catch receiver, one on each side of the catch receiver. This embodiment is powered by a battery 830. Powering the fixture with a battery 830 increases the adaptability of the fixture. A battery powered fixture is not confined to a location where a cord can reach an electrical outlet. In some embodiments, the battery 830 is a rechargeable battery integrated into the fixture. In some embodiments, the battery is any replaceable battery. The replaceable battery can be any of alkaline, nickel metal hydride (NiMH), Lithium, Lithium polymer, or other commercially available batteries.

In some embodiments, the electrical system within fixture face plate 803 may include a pair of electrical contact terminals 881, 883. Terminals 881, 883 represent an open circuit that would otherwise prevent electrically passing from Battery 830 to the lightbulb of the fixture that is connected to fixture face plate 803. In such a configuration, in order to use the fixture, and electrical connection must be formed between terminals 881, 883. Accordingly, as depicted in FIG. 8, mounting base 801 includes a pair of electrical terminals 884, 886. In an embodiment, terminals 884, 886 are shorted to one another.

When face plate 803 is properly mounted to base 801, terminals 881, 883 come into electrical contact with terminals 886, 884, respectively. As such, terminals 881, 883 become electrically connected to one another enabling power supply 830 to power the fixture's bulb and enable proper operation of the lighting fixture.

This configuration can prevent unwanted draining of the electrical energy stored within battery 830 when the fixture is not properly connected to base 801.

Figure 9:
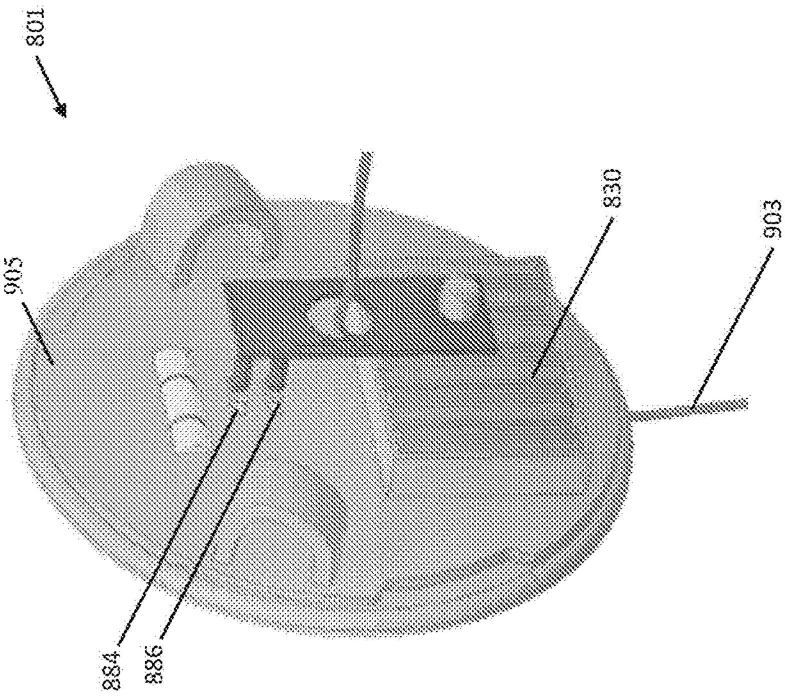
FIG. 9 is a rear view of a front portion of a mounting base of the present disclosure.

In still another embodiment, battery 830 may instead reside within base 801. This example configured of the base 801 is depicted in FIG. 9, which shows a rear-view of a front face 901 of base 801. Base 801 includes terminals 884, 886. Battery 830 is electrically connected to terminals 884, 886 to provide a voltage potential across terminals 884, 886. When fixture plate 803 is properly connected to base 801 and terminals 881, 883 are properly electrically connected to terminals 884, 886 the voltage across terminals 884, 886 may power the fixture. An optional removable electrical cord 903 is connected to battery 830 and may be used to supply electrical energy to battery 830 to charge battery 830.

As depicted in FIG. 9, base 801 may include a printed circuit board (PCB) 905 to which electronic components of the fixture, such as a battery charge controller, dimmer control circuitry (which may be connected to a potentiometer to provide input, such as potentiometer 18 or 218 of FIGS. 1 and 2) battery charge level indicator, and the like may be mounted and put into electrical connection with battery 830 and other components of the fixture. In embodiments, the charge level indicator mounted to PCB 905 may be a light bulb or other light generation element that modulates its color depending upon a charge level of battery 830.

In some embodiments the fixture is designed to be semi-permanent. The fixture will be installed and left alone. The fixture functions similarly to a permanently attached light fixture that is typically installed with screws. In other embodiments the fixtures are designed to be temporarily installed and then removed.

All patents and published patent applications referred to herein are incorporated herein by reference. However, any reference to prior publication is not, and should not be taken as an acknowledgement, admission, or suggestion that the prior publication, or any information derived from it is part of the general common knowledge in the field of endeavor to which this specification relates. The invention has been described with reference to various specific and preferred embodiments and techniques. Nevertheless, it is understood that many variations and modifications may be made while remaining within the spirit and scope of the invention.

What is claimed is:

1. A light fixture, comprising:

a mounting base, the mounting base including a surface for interfacing with a wall and at least one catch aperture;

a fixture component including:

a fixture face plate;

a decorative fixture element with a light socket; and a catch mechanism for coupling the fixture face plate to the mounting base, the catch mechanism including at least one catch insert configured to interface with the at least one catch aperture of the mounting base, wherein the fixture face plate is installable on the mounting base when the at least one catch insert is inserted into the at least one catch aperture and the fixture face plate is rotated relative to the mounting base in a first direction, and wherein the fixture face plate is removable from the mounting base when the fixture face plate is rotated relative to the mounting base in a second direction and the at least one catch insert is removed from the at least one catch aperture; and one or more double-sided adhesive strips for securing the surface of the mounting base to the wall, the one or more double-sided adhesive strips positionable on the surface of the mounting base prior to the surface interfacing with the wall, wherein a power source for the light socket is housed within the fixture face plate, and wherein the power source is installable with and removeable with the fixture face plate from the mounting base while the mounting base remains secured to the wall via the one or more double-sided adhesive strips.

2. The light fixture of claim 1, wherein the catch mechanism further comprises magnets that secure the at least one catch insert within at least one catch receiver, the at least one catch receiver extending from the at least one catch aperture.

3. The light fixture of claim 1, wherein the catch mechanism further comprises a screw that secures the fixture face plate to the mounting base.

4. The light fixture of claim 1, wherein the catch mechanism further comprises a receiver stop that holds the at least one catch insert in at least one catch receiver, the at least one catch receiver extending from the at least one catch aperture.

5. An apparatus for securing an object to a wall, comprising:

a mounting base, with a surface for interfacing with a wall;

a face plate configured to attach to the object;

a catch mechanism for coupling the face plate to the mounting base, the catch mechanism comprising:

at least one catch receiver;

at least one catch aperture; and at least one catch insert; and one or more double-sided adhesive strips for securing the surface of the mounting base to the wall, the one or more double-sided adhesive strips positionable on the surface of the mounting base prior to the surface interfacing with the wall, wherein the face plate is installable on the mounting base when the at least one catch insert is inserted into the at least one catch aperture and then rotated into the at least one catch receiver in a first direction, wherein the face plate is removable from the mounting base when the face plate is rotated relative to the mounting base in a second direction and the at least one catch insert is removed from the at least one catch aperture, wherein a power source for the object is housed within the face plate, and wherein the power source is installable with and removeable with the face plate from the mounting base while the surface of the mounting base remains secured to the wall via the one or more double-sided adhesive strips.

6. The apparatus of claim 5, wherein the object attached to the face plate is a digital picture frame.

7. The apparatus of claim 5, wherein the object attached to the face plate is a clock.

8. A device, comprising:

a mounting base, the mounting base comprising:

a catch aperture; and a surface configured to interface with a wall surface;

a fixture component, the fixture component comprising:

a fixture face plate;

a fixture post coupled to the fixture face plate;

a fixture hood coupled to the fixture post;

a light socket coupled to the fixture hood;

a catch mechanism for coupling to the catch aperture to secure the fixture face plate to the mounting base; and one or more double-sided adhesive strips for securing the surface of the mounting base to the wall surface, the one or more double-sided adhesive strips positionable on the surface of the mounting base prior to the surface interfacing with the wall surface, wherein the one or more double-sided adhesive strips are positioned on the surface of the mounting base fully within an area defined by a circumference of the mounting base.

9. The device of claim 8, wherein the catch mechanism includes a catch insert configured to interface with the catch aperture of the mounting base, wherein the fixture face plate is installable on the mounting base when the catch insert is inserted into the catch aperture and the fixture face plate is rotated relative to the mounting base in a first direction, and wherein the fixture face plate is removable from the mounting base when the fixture face plate is rotated relative to the mounting base in a second direction and the catch insert is removed from the catch aperture.

10. The device of claim 9, further comprising a battery electrically connected to the light socket, wherein the battery is housed within the fixture face plate, and wherein the battery is installable with and removeable with the fixture face plate from the mounting base while the mounting base remains secured to the wall via the one or more double-sided adhesive strips.

11. The device of claim 10, further comprising a first pair of electrical terminals in the fixture face plate and a second pair of electrical terminals in the mounting base and wherein the first pair of electrical terminals is in electrical contact with the second pair of electrical terminals when the fixture face plate is secured to the mounting base.

12. The device of claim 11, wherein the battery is configured to supply electrical energy through the first pair of electrical terminals and the second pair of electrical terminals when the fixture face plate is secured to the mounting base.

13. The device of claim 11, wherein the battery is contained within at least one of the mounting base and the fixture face plate.

14. The device of claim 10, further comprising an electrical cord removably coupled to the battery and configured to supply electrical energy to charge the battery.

15. The device of claim 10, further comprising a potentiometer electrically connected between the battery and the light socket, wherein the potentiometer is configured to modulate a flow of electrical energy from the battery to the light socket.

16. The device of claim 9, further comprising a first magnet mounted proximate the catch aperture and a second magnet mounted proximate the catch insert, wherein the first magnet and the second magnet retain the catch insert within the catch aperture when the fixture face plate is secured to the mounting base.

17. The device of claim 9, wherein the mounting base further comprises a receiver stop that holds the catch insert in the catch aperture.

18. The device of claim 17, wherein the receiver stop includes a narrowed portion of the catch aperture.

19. The device of claim 8, further comprising a level coupled to the mounting base.

20. The device of claim 8, wherein the one or more double-sided adhesive strips comprise at least two double-sided adhesive strips.

* * * * *